United States Patent
Meier et al.

(10) Patent No.: US 6,900,294 B2
(45) Date of Patent: May 31, 2005

(54) REACTIVE AZO DYES PREPARATION THEREOF AND USE THEREOF

(75) Inventors: Stefan Meier, Frankfurt am Main (DE); Werner Russ, Flörsheim (DE); Jörg Wörner, Bruchköbel (DE)

(73) Assignee: DyStar Textilfarben GmbH & Co. Deutschland KG (DE)

( * ) Notice: Subject to any disclaimer, the term of this patent is extended or adjusted under 35 U.S.C. 154(b) by 0 days.

(21) Appl. No.: 10/344,888

(22) PCT Filed: Aug. 11, 2001

(86) PCT No.: PCT/EP01/09310

§ 371 (c)(1),
(2), (4) Date: Feb. 14, 2003

(87) PCT Pub. No.: WO02/16504

PCT Pub. Date: Feb. 28, 2002

(65) Prior Publication Data

US 2003/0212261 A1 Nov. 13, 2003

(51) Int. Cl.$^7$ ............... C09B 62/008; D06P 1/38
(52) U.S. Cl. ...................... 534/638; 8/549
(58) Field of Search .............. 534/638; 8/549

(56) References Cited

U.S. PATENT DOCUMENTS

| | | | |
|---|---|---|---|
| 5,789,557 A | 8/1998 | Dornhagen et al. | 534/634 |
| 6,410,698 B1 | 6/2002 | Prechtl et al. | 534/638 |

FOREIGN PATENT DOCUMENTS

| | | |
|---|---|---|
| DE | 19810906 | 9/1999 |
| EP | 0 922 735 | 6/1999 |
| WO | 96/10610 | 4/1996 |
| WO | 97/25377 | 7/1997 |
| WO | 99/47608 | 9/1999 |

*Primary Examiner*—Fiona T Powers
(74) *Attorney, Agent, or Firm*—Connolly Bove Lodge & Hutz LLP

(57) ABSTRACT

The present invention relates to reactive dyes of the general formula (1)

$$ (1) $$

where
Y is a heterocyclic reactive group of the general formula (2) or (3)

$$ (2) $$

$$ (3) $$

where $X_1$ to $X_5$ are each as defined in claim 1, their preparation and their use for dyeing and printing hydroxyl- and/or carboxamido-containing materials.

13 Claims, No Drawings

REACTIVE AZO DYES PREPARATION THEREOF AND USE THEREOF

The present invention relates to the field of fiber-reactive dyes. WO 9610610, WO 9725377, WO 9947608 and EP-A 922735 disclose dyes that have structural similarities with the hereinbelow described dyes of the present invention, but that differ with regard to the reactive group or in the type of coupling component. These prior art dyes have a number of technical disadvantages in the dyeing of textile materials.

It has now been found that, surprisingly, the hereinbelow defined dyes of the general formula (1) are superior to prior art dyes.

The present invention accordingly provides reactive dyes of the general formula (1)

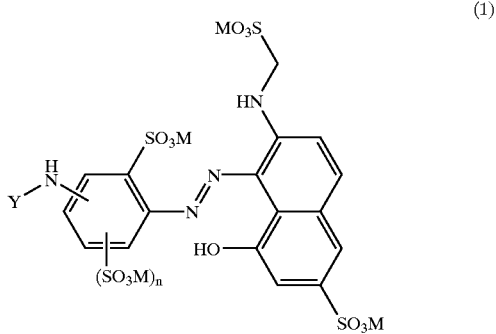

(1)

where
Y is a heterocyclic reactive group of the general formula (2) or (3)

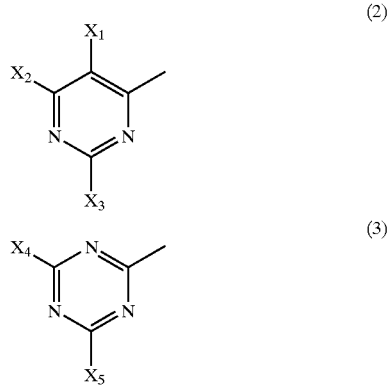

where
$X_1$ to $X_3$ are independently hydrogen, cyano or halogen, with the proviso that at least one of $X_1$ to $X_3$ is halogen,
$X_4$ is chlorine, fluorine or $X_5$,
$X_5$ is a group of the general formula (4)

(4)

where
$R_1$ is hydrogen, alkyl or aryl;
B is alkylene, arylene or arylalkylene, and B alkylene may be interrupted by an oxygen atom; and $R_2$ is an $SO_2CH_2CH_2Z$ or $SO_2CH=CH_2$ radical, where Z is an alkali-eliminable moiety;
n is 0 or 1; and
M is hydrogen, ammonium, an alkali metal or the equivalent of an alkaline earth metal,
subject to the proviso that the dye where Y is a group of the general formula (3) where $X_4$ is chlorine, $R_1$ is hydrogen, B is para-phenylene, n is 0 and the Y—NH— group is disposed meta to the diazo group and also the dyes where Y is a group of the general formula (3) where $X_4$ is chlorine, $R_1$ is hydrogen, B is ethylene and the Y—NH— group is disposed para or meta to the diazo group shall be excluded.

In the general formula (1), an alkali metal M may be selected in particular from the group consisting of lithium, sodium and potassium, while an alkaline earth metal M may be calcium in particular. M is preferably hydrogen or sodium. Halogen $X_1$ to $X_3$ is in particular fluorine or chlorine. $X_4$ is preferably fluorine or $X_5$. Alkyl $R_1$ is preferably $(C_1-C_8)$-alkyl, particularly preferably $(C_1-C_4)$-alkyl. Examples of such alkyl groups are methyl, ethyl, n-propyl, i-propyl, n-butyl, i-butyl, sec-butyl and tert-butyl.

Aryl $R_1$ is in particular phenyl, which may be substituted for example by one or more substituents selected from the group consisting of $(C_1-C_4)$-alkyl, $(C_1-C_4)$-alkoxy, chlorine, fluorine and $SO_3H$.

$R^1$ is preferably hydrogen, methyl or phenyl.

Alkylene B is preferably $(C_1-C_8)$-alkylene, particularly preferably $(C_1-C_4)$-alkylene. Examples of such alkylene groups are methylene, ethylene, n-propylene, i-propylene and butylene. Alkylene interrupted by an oxygen atom is preferably —$(CH_2)_2$—O—$(CH_2)_2$—.

Arylene B is in particular selected from the group consisting of phenylene and naphthylene, and meta- and para-phenylene are preferred.

Arylalkylene B is preferably a group of the general formulae (5a) or (5b)

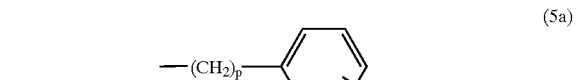

(5a)

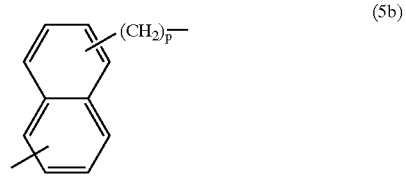

(5b)

where p is from 1 to 4 and the free valency on the aromatic nucleus may be attached to N or $R_2$.

Examples of Z radicals, which are eliminable by the action of alkali, i.e., under dyeing conditions, are chlorine, bromine, sulfato, thiosulfato, phosphato, $(C_2-C_5)$-alkanoyloxy such as for example acetyloxy, benzoyloxy, sulfobenzoyloxy or p-toluylsulfonyloxy, of which sulfato is preferred.

The terms "sulfato", "thiosulfato" and "phosphato" comprehend not only the acid form but also the salt form. Accordingly, thiosulfato groups conform to the general formula —S—$SO_3M$, phosphato groups conform to the general formula —$OPO_3M_2$ and sulfato groups conform to the general formula —$OSO_3M$, in each of which M is as defined above.

When $X_4$ is chlorine, preference is given to compounds where $R_1$ is not hydrogen, being in particular methyl or phenyl. When $X_4$ is chlorine and $R_1$ is hydrogen, preference is also given to compounds where B is not ethylene. In these cases, B has in particular the abovementioned other preferred meanings of B.
n is particularly preferably 0.
Preferred reactive dyes according to the invention are those of the general formula (1a)
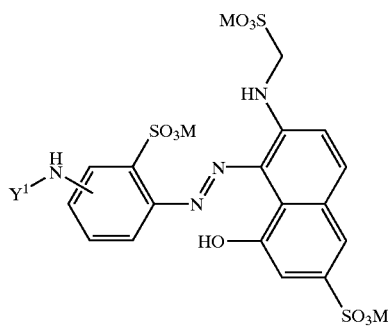
(1a)
where M is as defined above and $Y^1$ is one of the radicals (2a) to (2i)
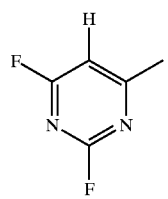
(2a)
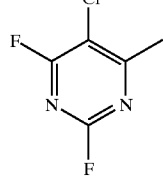
(2b)
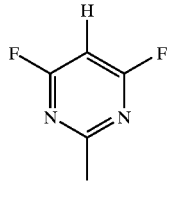
(2c)
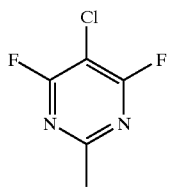
(2d)
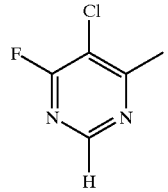
(2e)
-continued
(2f)
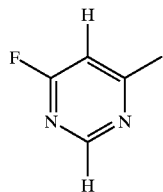
(2g)
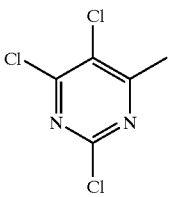
(2h)
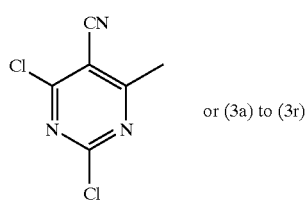
(2i)
or (3a) to (3r)
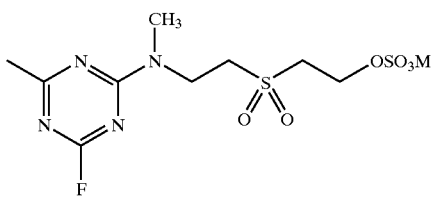
(3a)
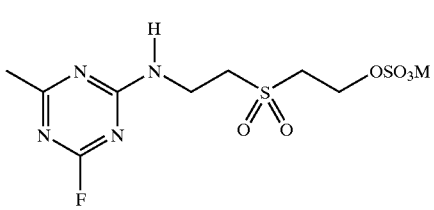
(3b)
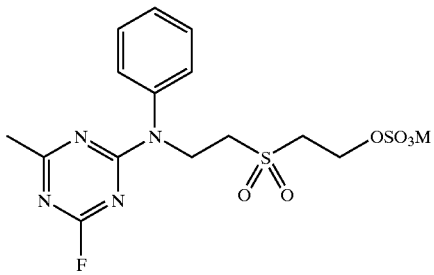
(3c)

-continued
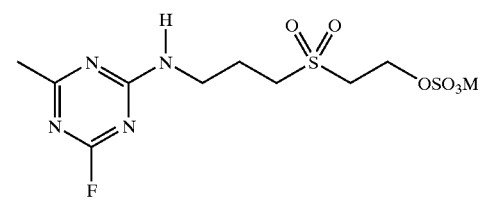
(3d)
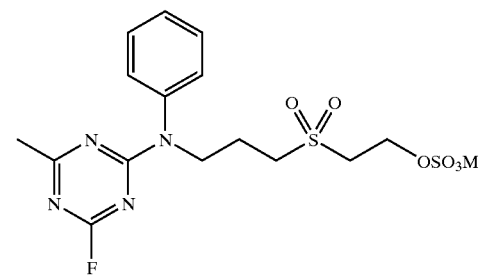
(3e)
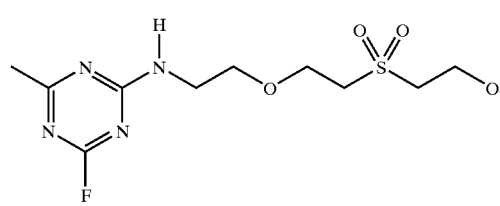
(3e')
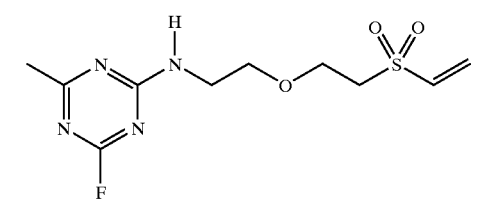
(3f)
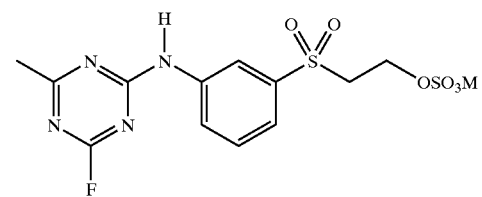
(3g)
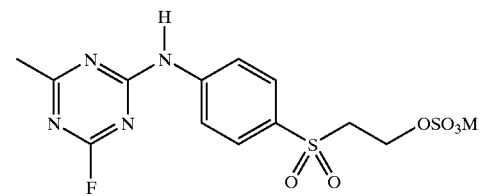
(3h)
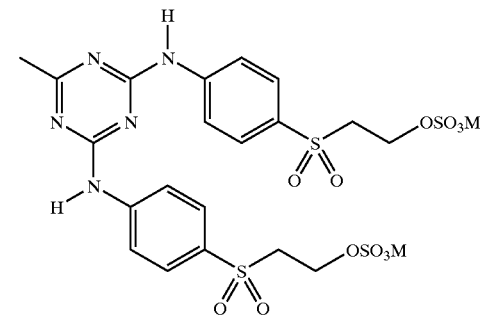
(3i)
-continued
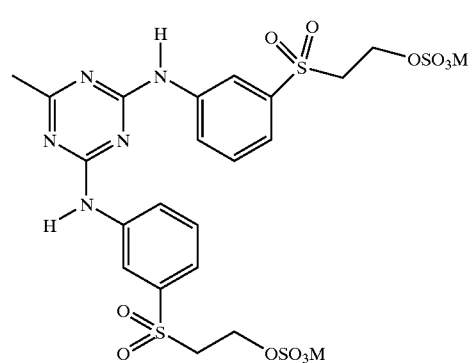
(3j)
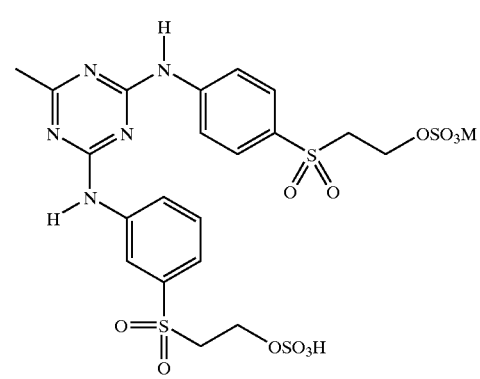
(3k)
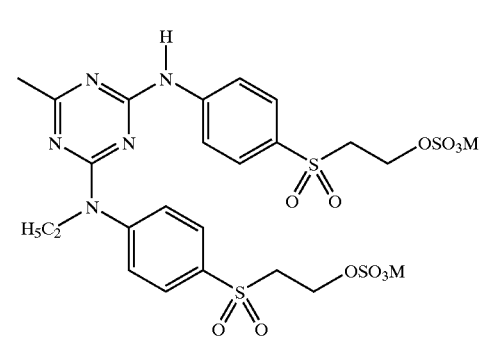
(3l)
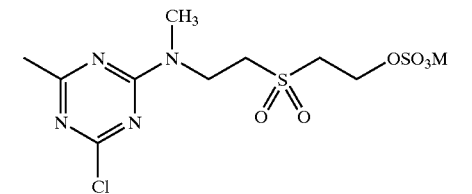
(3m)
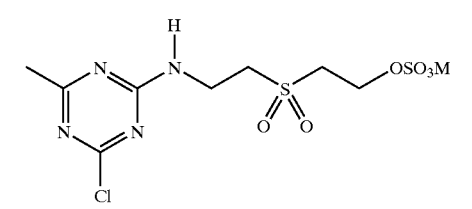
(3n)

(3o)
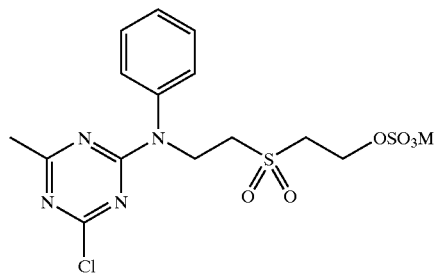
(3q)
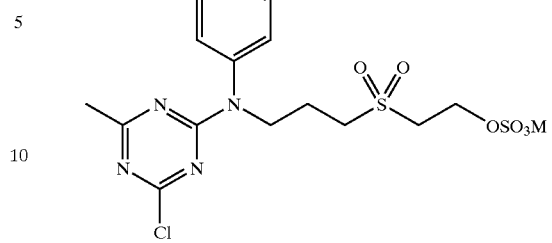
(3p)
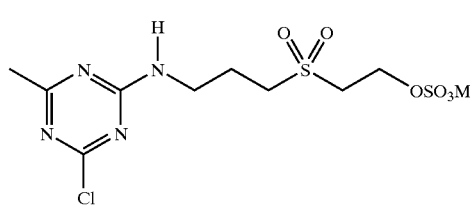
(3r)
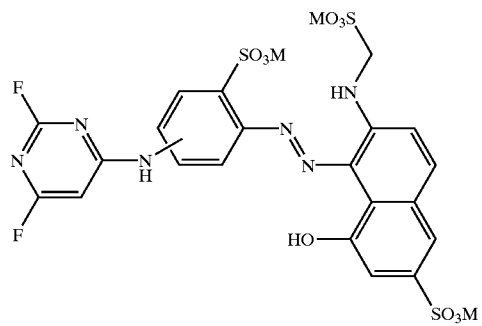
where M is as defined above.
Particular preference is given to the dyes of the formulae (1b) to (1e) according to the invention
(1b)
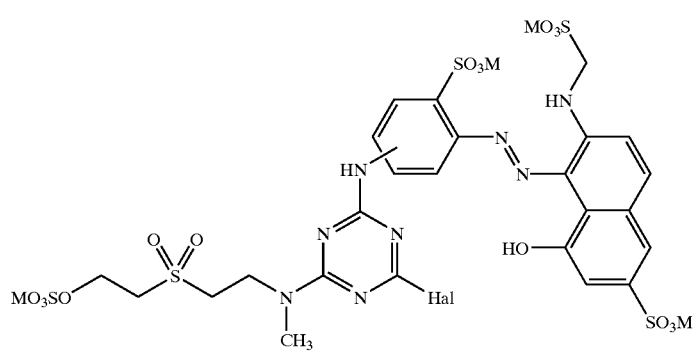
(1c)

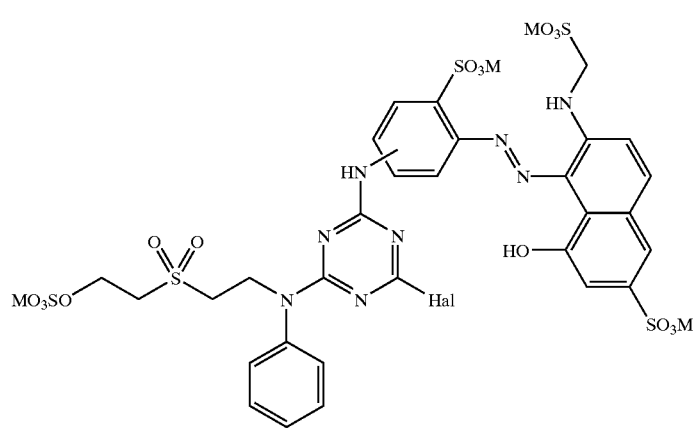

(1d)

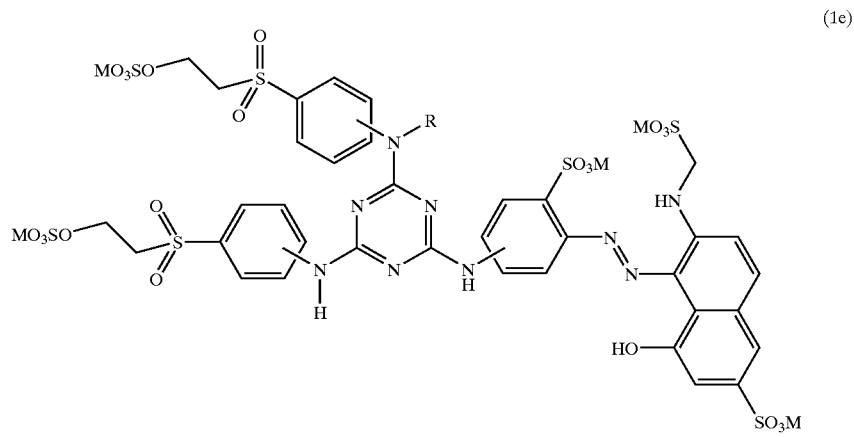

(1e)

where R is hydrogen, methyl or ethyl, Hal is fluorine or chlorine and M is as defined above.

Reactive dyes of the general formula (1) according to the invention where Y is a reactive group of the general formula (2) can be present in mixtures with each other in which the individual dyes differ especially only in the reactive group of the general formula (2). Preferred mixtures of this kind contain for example a reactive dye of the general formula (1) where Y=(2a) and a reactive dye of the general formula (1) where Y=(2c) or a reactive dye of the general formula (1) where Y=(2b) and a reactive dye of the general formula (1) where Y=(2d).

The reactive dyes of the general formula (1) according to the invention are generally present as a preparation in solid or liquid (dissolved) form. Their solid form generally contains the electrolyte salts, such as sodium chloride, potassium chloride and sodium sulfate, which are customary in the case of water-soluble and especially fiber-reactive dyes, and may further contain the auxiliaries customary in commercial dyes, such as buffer substances capable of setting a pH in aqueous solution between 3 and 7, such as sodium acetate, sodium borate, sodium bicarbonate, sodium dihydrogenphosphate, sodium tricitrate and disodium hydrogenphosphate, small amounts of siccatives or, when they are present in liquid, aqueous solution (including the presence of thickeners of the type customary in print pastes), they may also include substances which ensure a long life for these preparations, for example mold preventatives.

Preferably the reactive dyes of the general formula (1) according to the invention are present as dye powders or as dye granules containing 10 to 80% by weight, based on the powder or granule, of an electrolyte salt of the kind also known as a standardizing agent. Granules have particle sizes of 50 to 500 m in particular. These solid preparations may additionally contain the aforementioned buffer substances in a total amount of up to 10% by weight, based on the preparation. When the dyes are present in aqueous solution, the total dye content of these aqueous solutions is up to about 50% by weight, for example between 5 and 50% by weight, in which case the electrolyte salt content of these aqueous solutions is preferably below 10% by weight, based on the aqueous solution. The aqueous solutions (liquid preparations) may generally contain the aforementioned buffer substances in an amount of up to 10% by weight, preferably up to 2% by weight.

Reactive dyes of the general formula (1) according to the invention where Y is a group of the general formula 3 may have the same chromophore but differ with regard to the structure of the fiber-reactive group $R_2$. More particularly, for the same chromophore, $R_2$ may be —$SO_2CH$=$CH_2$ or —$SO_2CH_2CH_2Z$, particularly preferably βsulfatoethylsulfonyl. The proportion of dye in the vinylsulfonyl form may be up to about 30 mol %, based on the respective dye chromophore. Preferably, the ratio of vinylsulfonyl dye to β-ethyl-substituted dye is in a molar ratio between 5:95 and 30:70.

The present invention further provides processes for preparing the reactive dyes of the general formula (1).

They are obtainable by reacting the compounds of the formulae (6), (7) and (2') or (6), (7), (4') and trifluorotriazine or trichlorotriazine

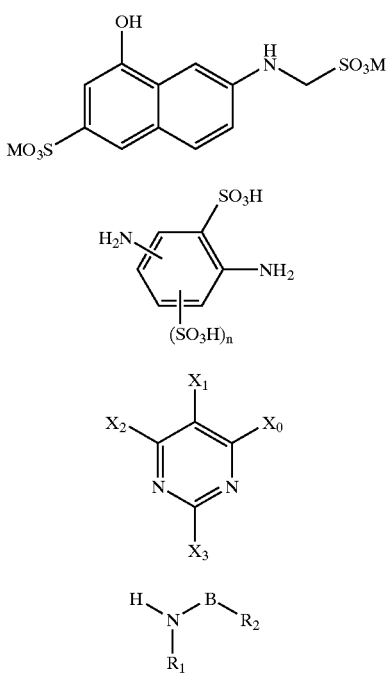

where M, n, $R_1$, $R_2$, B, $X_1$, $X_2$, $X_3$ are each as defined above and $X_0$ is fluorine or chlorine, in any desired order in conventional diazotization, coupling and condensation reactions.

For instance, a compound of the general formula (8)

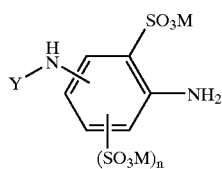

where Y, M and n are each as defined above, may be diazotized and reacted with a compound of the formula (6).

Alternatively, a compound of the general formula (9)

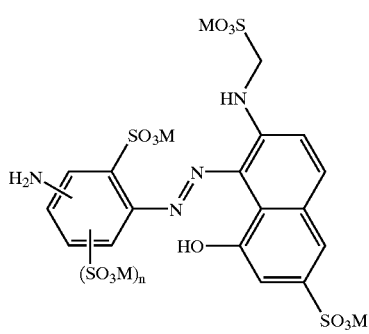

where M and n are each as defined above, may be condensed with a halopyrimidine of the general formula (2') or with a triazine of the general formula (3')

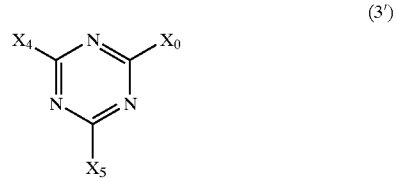

where $X_4$ and $X_5$ are each as defined above and $X_0$ is fluorine or chlorine. The compound of the general formula (3') may in turn be obtained from trifluorotriazine or trichlorotriazine and one or two compounds of the general formula (4').

Reactive dyes of the general formula (1) according to the invention where Y is a group of the general formula (3) where $X_4$ is fluorine or chlorine are also preparable by reacting a compound of the general formula (9) with trifluorotriazine or trichlorotriazine and subsequent condensation with an amine of the general formula (4').

Reactive dyes of the general formula (1) according to the invention where Y is a group of the general formula (3) where $X_4$ is $X_5$ are obtainable by reacting reactive dyes of the general formula (1) according to the invention where $X_4$ is fluorine or chlorine with an amine of the general formula (4').

The compounds of the general formula (8) are obtainable in various ways. When Y is a radical of the general formula (2), they are obtained by reacting halopyrimidines of the general formula (2') with aromatic diaminobenzenesulfonic acids, preferably 1,3-diaminobenzene-4-sulfonic acid or 1,4-diaminobenzene-2-sulfonic acid. When Y is a radical of the general formula (3), the compounds of the general formula (8) are obtained by reacting the compounds of the general formula (3') with aromatic diaminobenzenesulfonic acids, preferably 1,3-diaminobenzene-4-sulfonic acid or 1,4-diaminobenzene-2-sulfonic acid.

The abovementioned diazotization, coupling and condensation reactions are well known to one skilled in the art and may be executed in the generally customary manner, which is extensively described in the literature of the field. The dyes of the general formula (1) according to the invention are obtained as a solution or suspension from the above-described preparative processes and may be isolated by salting out. They may also be spray dried, and evaporation of the solution or suspension is also possible.

The reactive dyes of the general formula (1) according to the invention have useful application properties. They are used for the dyeing and printing of hydroxyl- and/or carboxamido-containing materials, for example in the form of sheetlike structures, such as paper and leather, or of films, of polyamide for example, or in bulk, as for example polyamide and polyurethane, but especially in the form of fibers of the materials mentioned. Preferably they are used for dyeing and printing cellulosic fiber materials of any kind. They are also useful for dyeing and printing hydroxyl-containing fibers present in blend fabrics, for example blends of cotton with polyester fibers or polyamide fibers. It is also possible to, use them to print textiles or paper by the inkjet process.

The present invention accordingly also provides for the use of the reactive dyes of the general formula (1) according to the invention for dyeing or printing the materials mentioned and processes for dyeing or printing such materials in a conventional manner by using one or more reactive dyes of the general formula (1) according to the invention as a colorant.

Advantageously, the as-synthesized solutions of the reactive dyes of the general formula (1) according to the invention can be used directly as a liquid preparation for dyeing, if appropriate after addition of a buffer substance and similarly if appropriate after concentrating or diluting.

The materials mentioned are preferably used in the form of fiber materials, especially in the form of textile fibers, such as fabrics or yarns, as in the form of hanks or packages.

Hydroxyl-containing materials are those of natural or synthetic origin, for example cellulose fiber materials or regenerated products thereof and polyvinyl alcohols. Cellulose fiber materials are preferably cotton, but also other vegetable fibers, such as linen, hemp, jute and ramie fibers. Regenerated cellulose fibers are for example staple viscose and filament viscose.

Carboxamido-containing materials are for example synthetic and natural polyamides and polyurethanes, especially in the form of fibers, for example wool and other animal hairs, silk, leather, nylon-6,6, nylon-6, nylon-11 and nylon-4.

The reactive dyes of the general formula (1) according to the invention can be applied to and fixed on the substrates mentioned, especially the fiber materials mentioned, by the application techniques known for water-soluble dyes, especially by the application techniques known for fiber-reactive dyes. On cellulose fibers they produce dyeings having very good color yields when applied by exhaust processes from a long liquor using various acid-binding agents and, if appropriate, neutral salts, such as sodium chloride or sodium sulfate. Dyeing is preferably carried out in an aqueous bath and at temperatures between 40 and 105° C., if appropriate at a temperature of up to 130° C. under superatmospheric pressure, and in the presence or absence of customary dyeing auxiliaries. One possible procedure is to introduce the material into the warm bath and to gradually heat the bath to the desired dyeing temperature and to complete the dyeing process at that temperature. Neutral salts, which accelerate the exhaustion of the dyes, may if desired not be added to the bath until after the actual dyeing temperature has been reached.

The padding process likewise provides excellent color yields and very good color build-up on cellulose fibers, and the dyes may be fixed in a conventional manner by batching at room temperature or elevated temperature, for example at up to about 60° C., by steaming or using dry heat.

Similarly, the customary printing processes for cellulose fibers, which can be carried out either single phase, for example by printing with a print paste containing sodium bicarbonate or some other acid-binding agent and by subsequent steaming at 100 to 103° C., or two-phase, for example by printing with a neutral or weakly acidic printing color and subsequent fixation either by passing the printed material through a hot electrolyte-containing alkaline bath or by overpadding with an alkaline electrolyte-containing padding liquor with subsequent batching or steaming or dry heat treatment of the alkali-overpadded material, produce strong prints having well-defined contours and a clear white ground. The outcome of the prints is little affected by changing fixing conditions.

When fixing by means of dry heat in accordance with the customary thermofix processes, hot air from 120 to 200° C. is used. In addition to the customary steam at 101 to 103° C., it is also possible to use superheated steam and high-pressure steam at temperatures of up to 160° C.

The acid-binding agents which effect the fixation of the dyes on the cellulose fibers are for example water-soluble basic salts of alkali metals and similarly alkaline earth metals of inorganic or organic acids or compounds that liberate alkali in the heat. Especially suitable are the alkali metal hydroxides and alkali metal salts of weak to medium inorganic or organic acids, the preferred alkali metal compounds being the sodium and potassium compounds. Such acid-binding agents include for example sodium hydroxide, potassium hydroxide, sodium carbonate, sodium bicarbonate, potassium carbonate, sodium formate, sodium dihydrogenphosphate, disodium hydrogenphosphate, sodium trichloroacetate, sodium silicate or trisodium phosphate.

The reactive dyes of the general formula (1) according to the invention are notable for high reactivity, good fixability, very good build-up and also high fastness to light and to perspiration/light. They can therefore be used for exhaust dyeing at low dyeing temperatures and require only short steaming times in pad-steam processes. The fixation yields are high, and the unfixed portions are readily washed off with the difference between the degree of exhaustion and the degree of fixation being remarkably small, i.e., the loss through hydrolysis being very small. They are also particularly useful for printing, especially on cotton, but also for printing nitrogenous fibers, for example wool or silk or blend fabrics containing wool or silk.

The reactive dyes of the general formula (1) according to the invention are further notable for the great ease with which unfixed dye portions are washed off the fiber material after the dyeing process without whites in the wash being stained by the detached dye. This provides advantages for the dyeing process in that wash cycles and hence costs are saved.

The dyeings and prints prepared using the reactive dyes of the general formula (1) according to the invention have, on cellulose fiber materials in particular, a high color strength and high fiber-dye bond stability not only in the acidic but also in the alkaline range, and also good lightfastness and very good wetfastness properties, such as fastness to washing, water, seawater, crossdyeing and perspiration and also good fastness to pleating and dry heat setting and rubbing.

The examples hereinbelow illustrate the invention. Parts and percentages are by weight, unless otherwise stated. Parts by weight relate to parts by volume as the kilogram relates to the liter.

The compounds described in the examples by means of a formula are indicated in the form of the free acid. Generally, however, they are prepared and isolated in the form of the alkali metal salts, such as lithium, sodium or potassium salts, and used for dyeing in the form of their salts. Similarly, the starting compounds and components mentioned in the examples hereinbelow, especially the table examples, in the form of the free acid may be used in the synthesis as such or in the form of their salts, preferably alkali metal salts.

The absorption maxima ($\gamma_{max}$) in the visible region reported for the dyes of the invention were determined on their alkali metal salts in aqueous solution.

EXAMPLE 1

18.8 parts of 1,3-diaminobenzene-4-sulfonic acid are suspended in 150 parts of water and converted into a neutral solution by addition of lithium hydroxide. After cooling to 10° C., 17.4 parts of 2,4,6-trifluoropyrimidine are added dropwise over an hour while a pH of 5.5 is maintained with 15% sodium carbonate solution. On completion of the addition the batch is allowed to warm to 20° to 25° C. and supplementarily stirred for another hour. This is followed by filtration and addition of 6.9 parts of sodium nitrite.

The filtrate is cooled to 10° C. by addition of ice and is added dropwise, over 30 minutes, to an initial charge of 100 parts of ice and 60 parts of concentrated hydrochloric acid (31%). After 1 hour of stirring, the excess nitrite is destroyed by addition of amidosulfuric acid.

23.9 parts of 6-amino-4-hydroxynaphthalene-2-sulfonic acid are dissolved in 300 parts of water by addition of aqueous sodium hydroxide solution. The neutral solution is heated to 50° C. and 13.4 parts of formaldehyde bisulfite (sodium salt) are added. After stirring for 30 minutes, the solution is cooled down to 20° C. and added dropwise over 30 minutes to the cold diazotization batch at 10° C.

A pH of 2.0 to 2.5 is obtained. After 1 hour of stirring the pH is adjusted to 5.5 with sodium carbonate solution and the solution is then buffered with $NaH_2PO_4/Na_2HPO_4$. The solution obtained is evaporated to dryness.

The dye obtained has the formula

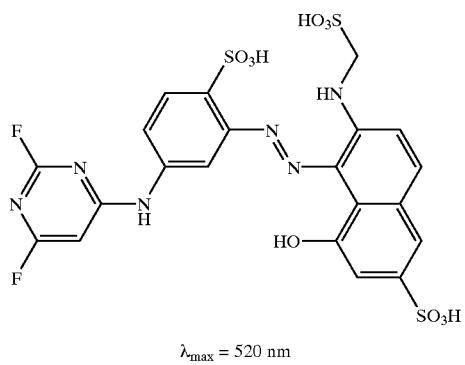

$\lambda_{max} = 520$ nm

The dye dyes and prints cotton in neutral red shades having good fastnesses, especially high lighffastness.

The dyes of examples 2 to 26 hereinbelow were obtained in a similar manner. The pyrimidine compound was reacted with the condensation component, diazotized and coupled onto the compound of the formula (7).

| Ex. | Pyrimidine | Condensation component | Hue | $\lambda_{max}$ |
|---|---|---|---|---|
| 2 | 5-Chloro-2,4,6-trifluoropyrimidine | 1,3-Diaminobenzene-4-sulfonic acid | red | 521 |
| 3 | 4,5,6-Trifluoropyrimidine | 1,3-Diaminobenzene-4-sulfonic acid | red | 520 |
| 4 | 5-Chloro-4,6-difluoropyrimidine | 1,3-Diaminobenzene-4-sulfonic acid | red | 520 |
| 5 | 4,6-Difluoropyrimidine | 1,3-Diaminobenzene-4-sulfonic acid | red | 521 |
| 6 | 2,4,5,6-Tetrachloropyrimidine | 1,3-Diaminobenzene-4-sulfonic acid | red | 520 |
| 7 | 5-Cyano-2,4,6-trichloropyrimidine | 1,3-Diaminobenzene-4-sulfonic acid | red | 520 |
| 8 | 5-Chloro-2,4,6-trifluoropyrimidine | 1,4-Diaminobenzene-2-sulfonic acid | red | 526 |
| 9 | 4,5,6-Trifluoropyrimidine | 1,4-Diaminobenzene-2-sulfonic acid | red | 525 |
| 10 | 5-Chloro-4,6-difluoropyrimidine | 1,4-Diaminobenzene-2-sulfonic acid | red | 526 |
| 11 | 4,6-Difluoropyrimidine | 1,4-Diaminobenzene-2-sulfonic acid | red | 526 |
| 12 | 2,4,5,6-Tetrachloropyrimidine | 1,4-Diaminobenzene-2-sulfonic acid | red | 525 |
| 13 | 5-Cyano-2,4,6-trichloropyrimidine | 1,4-Diaminobenzene-2-sulfonic acid | red | 527 |
| 14 | 2,4,6-Trifluoropyrimidine | 1,4-Diaminobenzene-2-sulfonic acid | red | 527 |
| 15 | 5-Chloro-2,4,6-trifluoropyrimidine | 1,3-Diaminobenzene-4,6-disulfonic acid | red | 521 |
| 16 | 4,5,6-Trifluoropyrimidine | 1,3-Diaminobenzene-4,6-disulfonic acid | red | 521 |
| 17 | 5-Chloro-4,6-difluoropyrimidine | 1,3-Diaminobenzene-4,6-disulfonic acid | red | 520 |
| 18 | 2,4,6-Trifluoropyrimidine | 1,3-Diaminobenzene-4,6-disulfonic acid | red | 521 |
| 19 | 2,4,5,6-Tetrachloropyrimidine | 1,3-Diaminobenzene-4,6-disulfonic acid | red | 521 |
| 20 | 5-Cyano-2,4,6-trichloropyrimidine | 1,3-Diaminobenzene-4,6-disulfonic acid | red | 521 |
| 21 | 5-Chloro-2,4,6-trifluoropyrimidine | 1,4-Diaminobenzene-2,5-disulfonic acid | red | 525 |
| 22 | 4,5,6-Trifluoropyrimidine | 1,4-Diaminobenzene-2,5-disulfonic acid | red | 525 |
| 23 | 5-Chloro-4,6-difluoropyrimidine | 1,4-Diaminobenzene-2,5-disulfonic acid | red | 526 |
| 24 | 2,4,6-Trifluoropyrimidine | 1,4-Diaminobenzene-2,5-disulfonic acid | red | 526 |
| 25 | 2,4,5,6-Tetrachloropyrimidine | 1,4-Diaminobenzene-2,5-disulfonic acid | red | 526 |
| 26 | 5-Cyano-2,4,6-trichloropyrimidine | 1,4-Diaminobenzene-2,5-disulfonic acid | red | 525 |

EXAMPLE 27

21.8 parts of 4-nitroaniline-2-sulfonic acid are suspended in 400 parts of water and neutralized with an aqueous NaOH solution. 6.9 parts of sodium nitrite are added, and the mixture is stirred until everything has dissolved.

The solution obtained is added dropwise, at 0° to 5° C., to an initial charge of 80 parts of ice and 30 parts of hydrochloric acid (31%) and stirred in for 60 minutes. Excess nitrite is removed by addition of amidosulfuric acid solution. A solution of N-sulfomethylene gamma acid is prepared separately as described in example 1 and cooled down to 10° C. This solution is then added to the suspension of the diazonium salt and the pH is adjusted to 2.0 by addition of sodium carbonate solution.

This provides a dye solution which contains a compound of the formula (10)

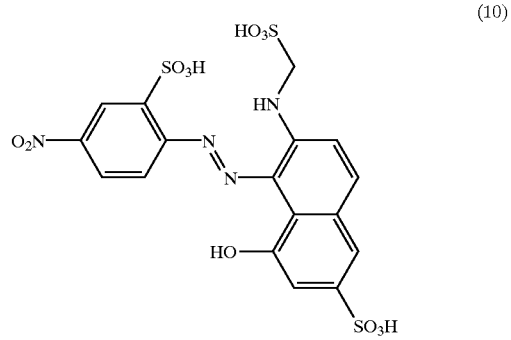

(10)

in the form of the free acid. The solution of compound (10) is then warmed to 35° to 40° C. and adjusted to pH 8.5 with aqueous NaOH. A solution of 5.6 parts of NaHS in 50 parts of water is added dropwise while the pH is kept constant at 8.5 by addition of hydrochloric acid.

The compound obtained is precipitated by addition of 150 parts of sodium chloride, filtered off and washed with aqueous sodium chloride solution. The compound obtained conforms to the formula (9a)

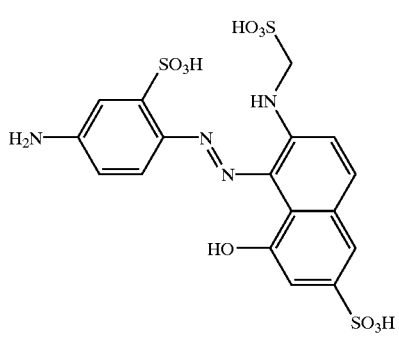

(9a)

in the form of its free acid.

53.2 parts of compound (9a) are dissolved in 500 parts of water. After cooling to 15° C., 13.4 parts of 2,4,6-trifluoropyrimidine are added dropwise over an hour at 15° C. The pH is maintained at 6.5 by addition of aqueous sodium carbonate solution. On completion of the addition the batch is stirred at 30° to 35° C. for an hour. The end-point of the reaction is determined by thin layer chromatography. Sodium chloride is added to precipitate the dye of example 14, which is filtered off with suction and dried.

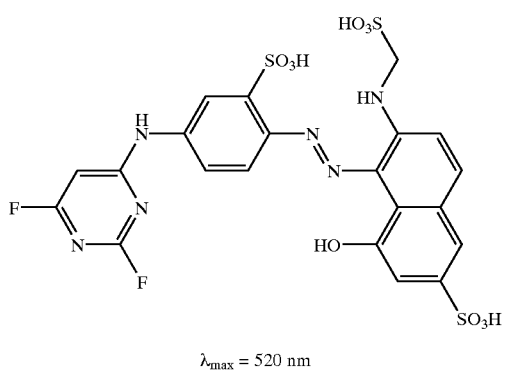

$\lambda_{max} = 520$ nm

It dyes cotton in a bluish red hue.

The compounds of the formulae of examples 8 to 13 are preparable in a similar manner by condensing compound (9a) with appropriate pyrimidine derivatives.

EXAMPLE 28

53.2 parts of compound (9a) are dissolved in 500 parts of water. 4.2 g of sodium fluoride are added and the batch is cooled down to 5° C. 13.5 parts of 2,4,6-trifluorotriazine are then added dropwise over 5 minutes. The pH drops at first and then steadies at about 4.5 to 5.0. On completion of the addition the reaction solution is stirred for 15 minutes. It is then admixed with a neutral aqueous solution of N-methylaminoethyl 2-sulfatoethyl sulfone added dropwise, and is allowed to warm to 20° to 25° C. while at the same time the pH is kept constant at 6.5 to 7.0 by addition of aqueous sodium carbonate solution.

The end-point of the reaction is determined by thin layer chromatography. After the reaction has ended, the dye is salted out by addition of sodium chloride, filtered off with suction and dried. It conforms to the formula $\lambda_{max} = 520$ nm and dyes cotton in strongly bluish red shades having good fastnesses, especially high lightfastness.

Examples 29 to 35 reported below in the table were obtained in a similar manner by first reacting the dyebase (9a) with trifluorotriazine or trichlorotriazine and then condensing the product with an amine of the general formula (4').

| Ex. | Amine of formula (4') | Condensation component | Hue | $\lambda_{max}$ |
|---|---|---|---|---|
| 29 | | | red | 526 |
| 30 | | " | red | 525 |

| Ex. | Amine of formula (4') | Condensation component | Hue | $\lambda_{max}$ |
|---|---|---|---|---|
| 31 | HO₃SO—CH₂CH₂—SO₂—CH₂CH₂CH₂—NH₂ | " | red | 526 |
| 32 | HO₃SO—CH₂CH₂—SO₂—CH₂CH₂—NH—C₆H₅ | [structure with dichlorotriazine linked to sulfophenyl-azo-aminonaphthol-disulfonic acid] | red | 525 |
| 33 | HO₃SO—CH₂CH₂—SO₂—CH₂CH₂—NH—CH₃ | " | red | 527 |
| 34 | CH₂=CH—SO₂—CH₂CH₂—O—CH₂CH₂—NH₂ | " | red | 526 |
| 35 | HO₃SO—CH₂CH₂—SO₂—CH₂CH₂CH₂—NH₂ | " | red | 526 |

EXAMPLE 36

28.1 parts of 4-(2'-sulfatoethylsulfonyl)aniline are dissolved in 250 parts of water by neutralization with solid sodium bicarbonate. 4.2 parts of sodium fluoride are added to the solution, followed by cooling to 0° to 5° C. by addition of ice. Then, 13.5 parts of trifluorotriazine are added dropwise over 5 minutes, during which the pH drops rapidly at first and then steadies at 4.5 to 5.0. On completion of the addition the batch is stirred for a further 15 minutes. A solution of 53.2 parts of the compound of formula (9a) in 500 ml of water is then added dropwise and the pH is adjusted to 6.0 to 6.5. To complete the reaction, the batch is warmed to 30° to 35° C. and subsequently stirred for 60 minutes. Sodium chloride is added to precipitate the dye, which is filtered off with suction and dried. This provides a dark red dye powder whose structure conforms to the formula

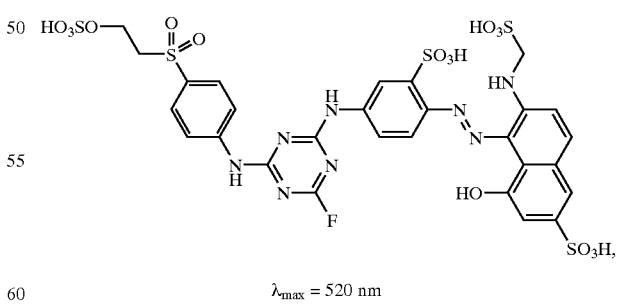

$\lambda_{max}$ = 520 nm

The dye dyes cotton in strongly bluish red shades having good fastnesses, especially high lighffastness.

Examples 37 to 40 reported below in the table are obtained in a similar manner by first reacting the amine of the general formula (4') with trifluorotriazine or trichlorotriazine and then condensing the product with the compound of the formula (9a).

| Ex. | Amine of formula (4') | Halotriazine | Condensation component | Hue | $\mu_{max}$ |
|---|---|---|---|---|---|
| 37 | HO₃SO-CH₂CH₂-SO₂-CH₂CH₂-NH-C₆H₅ | 2,4,6-trifluoro-1,3,5-triazine | H₂N-C₆H₃(SO₃H)-N=N-[naphthalene with HO₃S-CH₂-NH, HO, SO₃H substituents] | red | 527 |
| 38 | 3-(HO₃SO-CH₂CH₂-SO₂)-C₆H₄-NH₂ | " | " | red | 527 |
| 39 | 4-(HO₂SO-CH₂CH₂-SO₂)-C₆H₄-NH₂ | 2,4,6-trichloro-1,3,5-triazine | " | red | 528 |
| 40 | 3-(HO₃SO-CH₂CH₂-SO₂)-C₆H₄-NH₂ | " | " | red | 528 |

EXAMPLE 41

28.1 parts of 4-(2'-sulfatoethylsulfonyl)aniline are dissolved in 250 parts of water by neutralization with solid sodium bicarbonate. 4.2 parts of sodium fluoride are added to the solution, followed by cooling to 0° to 50° C. by addition of ice. Then, 13.5 parts of trifluorotriazine are added dropwise over 5 minutes, during which the pH drops rapidly at first and then steadies at 4.5 to 5.0. On completion of the addition the batch is stirred for a further 15 minutes. A neutralized solution of 18.8 parts of 1,3-diamino-benzene-4-sulfonic acid in water is then added dropwise and the pH is adjusted to 6.0 to 6.5. To complete the reaction, the batch is warmed to 30° to 35° C. and subsequently stirred for 60 minutes. The solution obtained is filtered and admixed with 6.9 parts of sodium nitrite.

The solution obtained is cooled to 10° C. by addition of ice and added dropwise over 30 minutes to an initial charge of 100 parts of ice and 60 parts of concentrated hydrochloric acid (31%). After 1 hour of stirring, excess nitrite is destroyed by addition of amidosulfuric acid.

23.9 parts of 6-amino-4-hydroxynaphthalene-2-sulfonic acid are dissolved in 300 parts of water by addition of aqueous sodium hydroxide solution. The neutral solution is heated to 50° C. and 13.4 parts of formaldehyde bisulfite (sodium salt) are added. After stirring for 30 minutes, the solution (compound of the formula (b)) is cooled down to 20° C. and added dropwise over 30 minutes to the cold diazotization batch at 10° C.

A pH of 2.0 to 2.5 is obtained. After 1 hour of stirring the pH is adjusted to 5.5 with sodium carbonate solution and the solution is then buffered with $NaH_2PO_4/Na_2HPO_4$. The solution obtained is evaporated to dryness.

This provides a red dye powder whose structure conforms to the formula

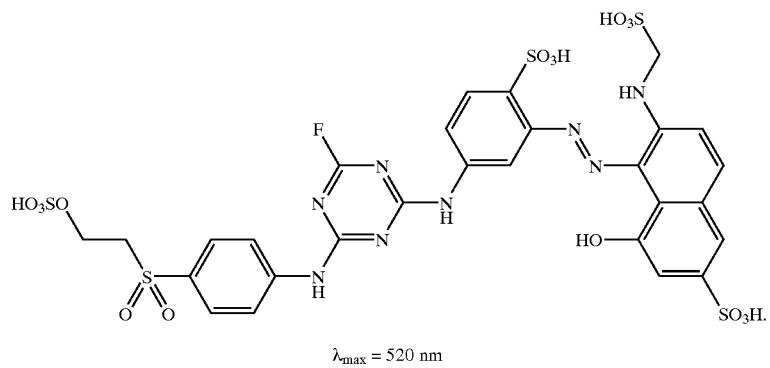

λ_max = 520 nm

The dye dyes cotton in strongly bluish red shades having good fastnesses, especially high lightfastness.

Examples 42 to 51 reported below in the table are obtained in a similar manner by first reacting the amine of the formula (4') with trifluorotriazine and then condensing the product with 1,3-diaminobenzene-4-sulfonic acid or 1,4-diaminobenzene-2-sulfonic acid. The dyes described are obtained after diazotization and coupling onto the compound of the formula (6).

| Ex. | Amine of formula (4') | Halotriazine | Condensation component | Hue | λ_max |
|---|---|---|---|---|---|
| 42 | HO₃SO-CH₂CH₂-SO₂-CH₂CH₂-NH-C₆H₅ | trifluorotriazine | 2,4-diaminobenzenesulfonic acid | red | 521 |
| 43 | 3-(HO₃SO-CH₂CH₂-SO₂-)aniline | " | " | red | 523 |
| 44 | HO₃SO-CH₂CH₂-SO₂-CH₂CH₂-NH-C₆H₅ | cyanuric chloride | ditto | red | 522 |
| 45 | 3-(HO₃SO-CH₂CH₂-SO₂-)aniline | " | " | red | 523 |
| 46 | 4-(HO₂SO-CH₂CH₂-SO₂-)aniline | trifluorotriazine | 1,4-diaminobenzene-2-sulfonic acid | red | 528 |

-continued

| Ex. | Amine of formula (4') | Halotriazine | Condensation component | Hue | λ_max |
|---|---|---|---|---|---|
| 47 | HO₃SO-CH₂CH₂-SO₂-CH₂CH₂-NH-C₆H₅ | " | " | red | 527 |
| 48 | 3-(HO₃SO-CH₂CH₂-SO₂)-C₆H₄-NH₂ | " | " | red | 527 |
| 49 | 4-(HO₂SO-CH₂CH₂-SO₂)-C₆H₄-NH₂ | 2,4,6-trichloro-1,3,5-triazine | " | red | 527 |
| 50 | HO₃SO-CH₂CH₂-SO₂-CH₂CH₂-NH-C₆H₅ | " | " | red | 528 |
| 51 | 3-(HO₃SO-CH₂CH₂-SO₂)-C₆H₄-NH₂ | " | " | red | 528 |

The dyes of examples 46, 47, 48, 49 and 51 are structurally equivalent to the dyes of examples 36, 37, 38, 39 and 40.

EXAMPLE 52

28.1 parts of 4-(2'-sulfatoethylsulfonyl)aniline are dissolved in 250 parts of water by neutralization with solid sodium bicarbonate. 92.4 parts of the dye of example 46 are introduced into the solution and the pH is adjusted to 5.5 to 6.0. The solution is heated to 80° to 90° C. and the pH is maintained within the set range by addition of aqueous sodium carbonate solution. The course of the reaction is monitored by thin layer chromatography.

After the reaction has ended, the dye solution is cooled, buffered and dried. This provides a dark red powder whose structure conforms to the formula

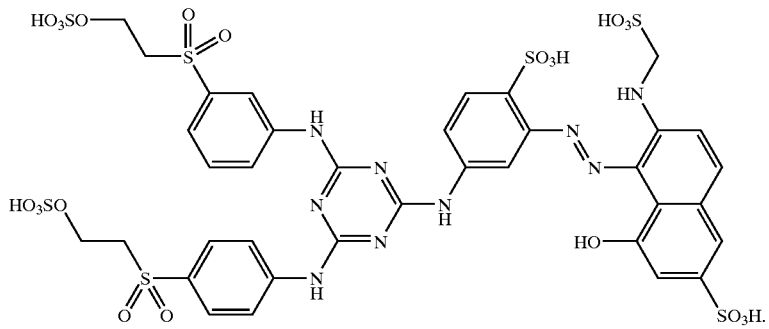

λ_max = 520 nm

It dyes cotton in a bluish red shade having good fastnesses, especially high lightfastness.

Examples 53 to 59 reported below in the table are obtained in a similar manner by condensing the reported starting dyes with an amine of the formula (4').

| Ex. | Starting dye | Amine of formula (4') | Hue | $\lambda_{max}$ |
|---|---|---|---|---|
| 53 | Dye of example 39 | F (trifluorotriazine) | red | 531 |
| 54 | Dye of example 40 | " | red | 530 |
| 55 | Dye of example 39 | 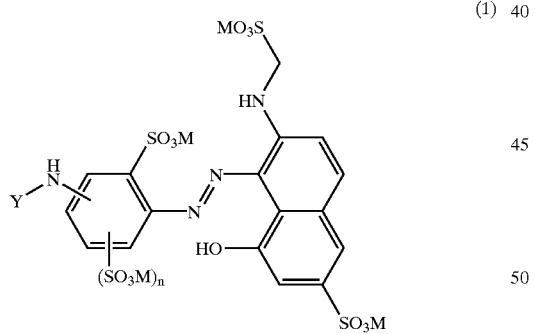 | red | 531 |
| 56 | Dye of example 40 | " | red | 530 |
| 57 | Dye of example 45 | " | red | 524 |
| 58 | Dye of example 51 | " | red | 523 |
| 59 | Dye of example 51 | 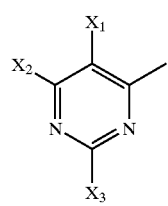 | red | 522 |

What is claimed is:

1. A reactive dye of the formula (1)

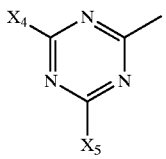

(1)

wherein

Y is a heterocyclic reactive group of the formula (2) or (3)

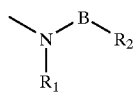

(2)

-continued (3)

wherein $X_1$ to $X_3$ are independently hydrogen, cyano or halogen, with the proviso that at least one of $X_1$ to $X_3$ is halogen, $X_4$ is fluorine or $X_5$, Xs is a group of the general formula (4)

(4)

wherein $R_1$ is hydrogen, alkyl or aryl;

B is alkylene, arylene or arylalkylene, and B alkylene is optionally interrupt by an oxygen atom; and $R_2$ is an $SO_2CH_2CH_2Z$ or $SO_2CH=CH_2$ radical, wherein Z is an alkali-eliminable moiety;

n is 0 or 1; and

M is hydrogen, ammonium, an alkali metal or the equivalent of an alkaline earth metal.

2. The reactive dye as claimed in claim 1, wherein n is 0.

3. The reactive dye as claimed in claim 1, wherein
Y is a heterocyclic reactive group of the formula (3),
$R_1$ is hydrogen, $(C_1-C_4)$-alkyl or phenyl,
B is ethylene, propylene or phenylene and
$R_2$ is an $-SO_2CH_2CH_2Z$ radical wherein Z is sulfato.

4. The reactive dye as claimed in claim 2, wherein
Y is a heterocyclic reactive group of the formula (3),
$R_1$ is hydrogen, $(C_1-C_4)$-alkyl or phenyl,
B is ethylene, propylene or phenylene and
$R_2$ is an $-SO_2CH_2CH_2Z$ radical wherein Z is sulfato.

5. The reactive dye as claimed in claim 1, wherein the dye of formula (1) is a dye of the formula (1a)

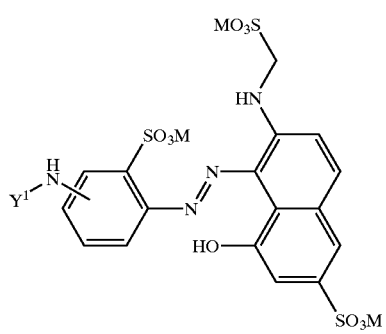

(1a)

wherein
M is hydrogen, ammonium, an alkali metal or the equivalent of an alkaline earth metal, and
$Y^1$ is one of the radicals (2a) to (2i)

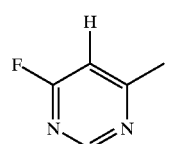

(2a)

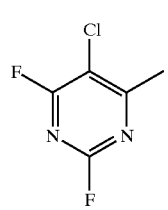

(2b)

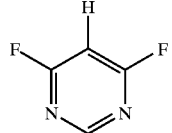

(2c)

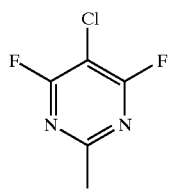

(2d)

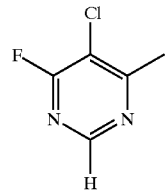

(2e)

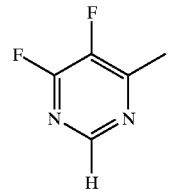

(2f)

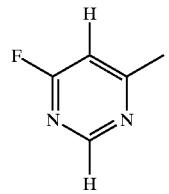

(2g)

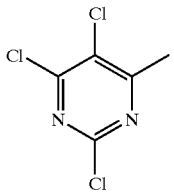

(2h)

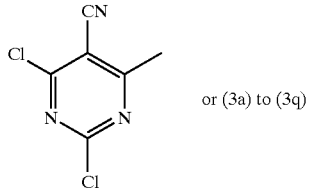

(2i) or (3a) to (3q)

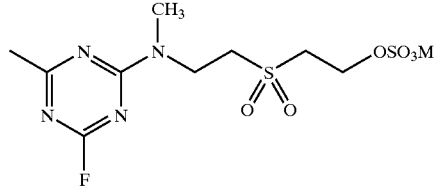

(3a)

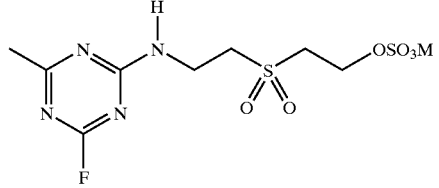

(3b)

(3c) 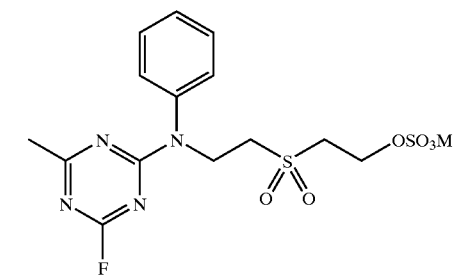
(3d) 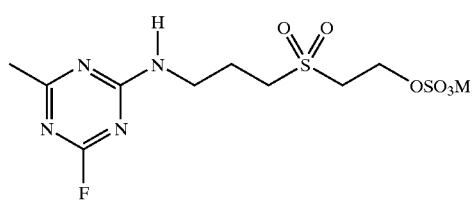
(3e) 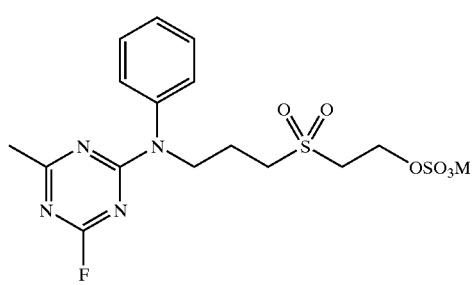
(3e′) 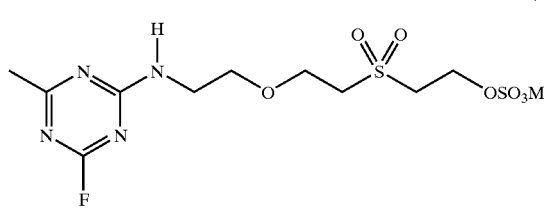
(3f)
(3g) 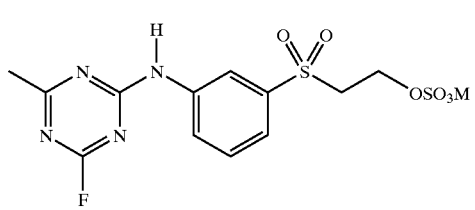
(3h) 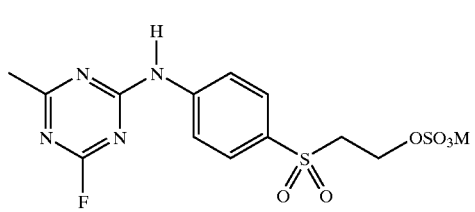
(3i) 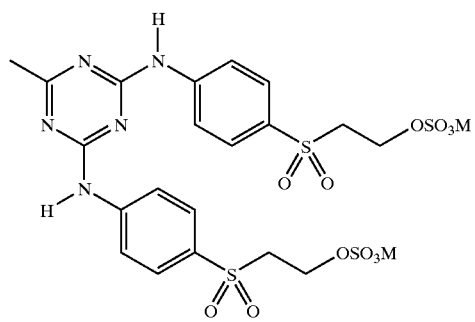
(3j) 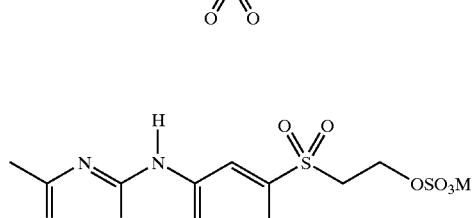
(3k) 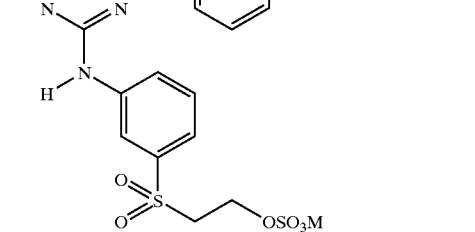
(3l) 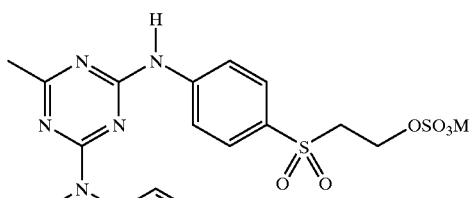
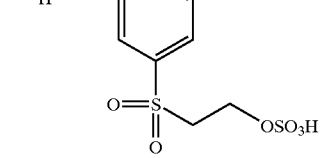
where M is as above.

6. The reactive dye as claimed in claim 1, wherein the dye of formula (1) is a dye of the formulae (1b) to (1e)
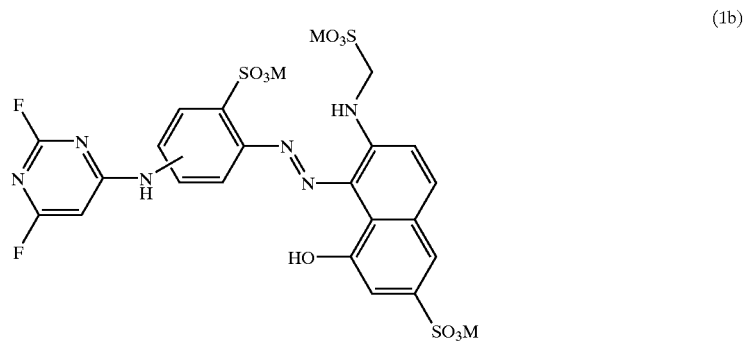
(1b)
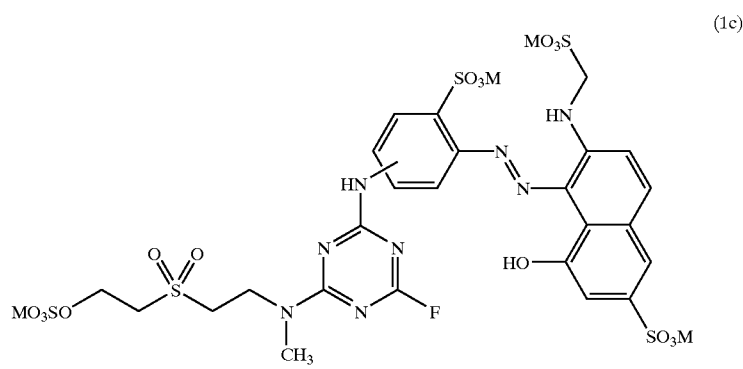
(1c)
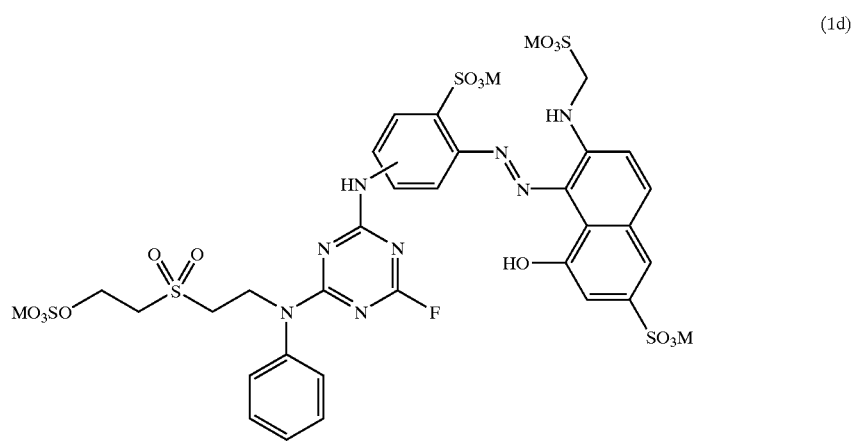
(1d)
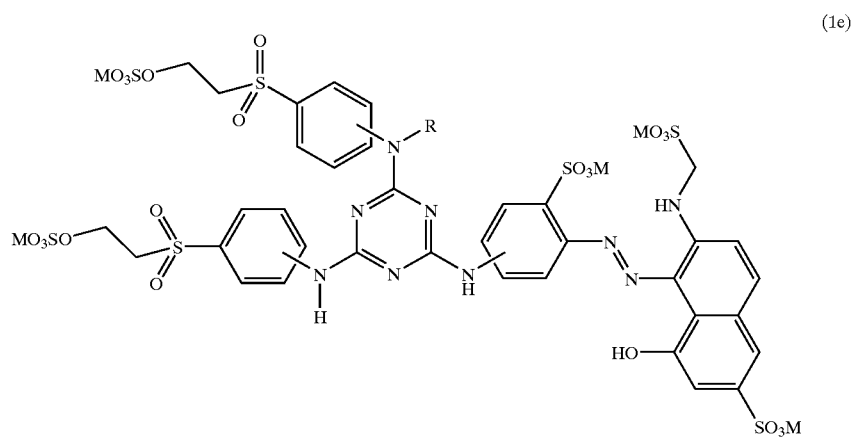
(1e)

wherein R is hydrogen, methyl or ethyl and M is hydrogen, ammonium, an alkali metal or the equivalent of an alkaline earth metal.

7. The reactive dye as claimed in claim 1, wherein M is hydrogen or sodium.

8. The reactive dye as claimed in claim 6, wherein M is hydrogen or sodium.

9. A process for preparing the reactive dye as claimed in claim 1, which comprises constructing said dye by reacting the compounds of the formulae (6), (7) and (2') or (6), (7), (4') and trifluorotriazine

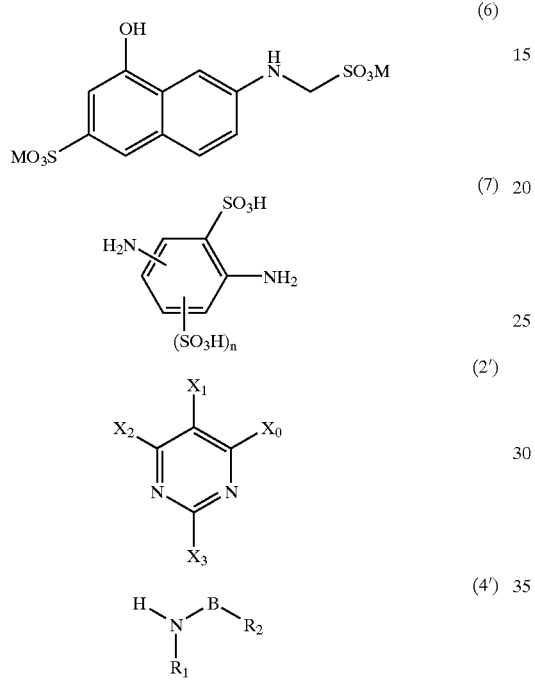

wherein M, n, $R_1$, $R_2$, B, $X_1$, $X_2$, $X_3$ are each as defined in claim 11 and $X_0$ is fluorine or chlorine, in any order in diazotization, coupling and condensation reactions.

10. The process of claim 9, wherein a compound of the formula (8)

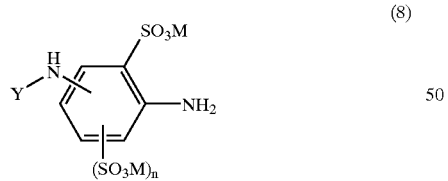

is hydrogen, ammonium, an alkali metal or the equivalent of an alkaline earth metal, is diazotized and reacted with a compound of the formula (6).

11. The process of claim 9, wherein a compound of the formula (9)

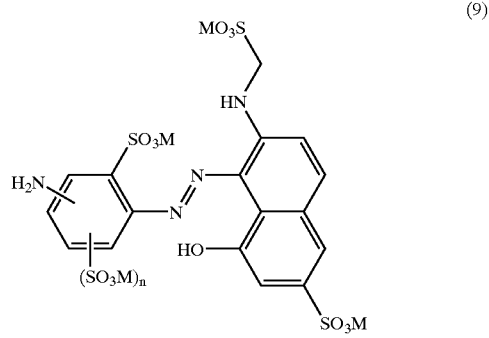

wherein M is hydrogen, ammonium, an alkali metal or the equivalent of an alkaline earth metal, n is 0 or 1, is condensed with a halopyrimidine of the formula (2') or with a triazine of the formula (3')

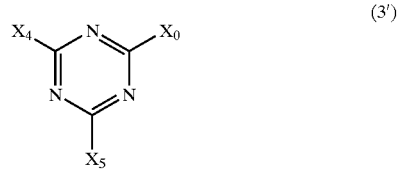

$X_4$ is fluorine or $X_5$,
$X_5$ is a group of the general formula (4)

wherein $R_1$ is hydrogen, alkyl or aryl;

B is alkylene, arylene or arylalkylene, and B alkylene is optionally interrupted by an oxygen atom; and $R_2$ is an $SO_2CH_2CH_2Z$ or $SO_2CH=CH_2$ radical, wherein Z is an alkali-eliminable moiety; and $X_0$ is fluorine.

12. A process for dyeing and printing hydroxyl- and/or carboxamido-containing material, which comprises contacting the material with said dye as claimed in claim 1.

13. The process as claimed in claim 12 wherein the material is a fiber material.

* * * * *

UNITED STATES PATENT AND TRADEMARK OFFICE
CERTIFICATE OF CORRECTION

PATENT NO.    : 6,900,294 B2
DATED         : May 31, 2005
INVENTOR(S)   : Stefan Meier et al.

It is certified that error appears in the above-identified patent and that said Letters Patent is hereby corrected as shown below:

Column 35,
Line 42, "claim 11 and" should read -- claim 1 and --.

Signed and Sealed this

Twenty-seventh Day of September, 2005

JON W. DUDAS
*Director of the United States Patent and Trademark Office*